United States Patent [19]

Wolfe

[11] 4,276,103
[45] Jun. 30, 1981

[54] ADJUSTABLE TIRE TREAD AND METHOD OF APPLICATION OF A TREAD

[75] Inventor: Merritt W. Wolfe, Akron, Ohio

[73] Assignee: The Goodyear Tire & Rubber Company, Akron, Ohio

[21] Appl. No.: 157,994

[22] Filed: Jun. 9, 1980

[51] Int. Cl.³ .............................................. B29H 17/36
[52] U.S. Cl. .................................................... 156/96
[58] Field of Search ............... 152/175, 176, 179, 187, 152/188, 191, 209 R, 209 B, 221, 226, 306, 344; 156/96, 126–129; 428/36

[56] References Cited

U.S. PATENT DOCUMENTS

| | | | |
|---|---|---|---|
| 1,311,750 | 7/1919 | Brashear | 152/176 |
| 2,345,518 | 3/1944 | Wendel | 156/96 |
| 2,655,971 | 10/1953 | Gross | 152/175 |
| 2,856,979 | 10/1958 | Branch | 152/175 |
| 3,455,753 | 7/1969 | Schelkmann | 156/96 |
| 3,511,291 | 5/1970 | Ragan | 152/209 B |
| 3,770,038 | 11/1973 | Wolfe | 152/209 |
| 3,815,651 | 6/1974 | Neal | 152/187 |
| 3,945,417 | 3/1976 | Harrelson | 152/209 B |

Primary Examiner—John E. Kittle
Attorney, Agent, or Firm—J. C. Simmons

[57] ABSTRACT

A tire tread and method of application of a tire tread. The tread is not provided with an undertread. At least one transversely extending tread element is interconnected with a pair of tread portions in such a manner as to permit canting of the tread portions relative to the tread element whereby the length of the tread is adjustable to achieve a tread length corresponding to a particular tire circumference to facilitate application of the tread to a tire.

11 Claims, 5 Drawing Figures

ADJUSTABLE TIRE TREAD AND METHOD OF APPLICATION OF A TREAD

This invention relates to tires. More particularly, this invention relates to treads for application to tires. An important aspect of this invention concerns the use of precured treads for retreading or relugging large off-the-road tires.

The tread of a tire is sometimes subjected to severe wear and abrasion conditions in normal operation which causes the tread to wear out long before the carcass or any other structural member of the tire. Under these circumstances, the tire can be returned to a retreading shop where the tread can be replaced. The crown area of the tire is buffed and any cuts or holes in the carcass are repaired. In one known method of retreading a tire, a relatively thin coating of uncured rubber is placed around the periphery of the tire in the crown area and a tread is adhered to the coating of uncured rubber. The tire is then placed in vulcanizing apparatus such as a pressure vessel or autoclave to cure the coating of uncured rubber so that the tread is integrally connected with the carcass.

If a tire is retreaded with a conventional tread having an undertread, the tread may be too long or too short to fit properly around the circumference of the tire since the diameters of used tire carcasses of the same standard size will vary.

One method of solving this problem has been to adhere individual lugs or groups of lugs to the coating of uncured rubber and to space them so that they fill the entire circumference of the carcass properly. Unfortunately, this is a time-consuming process.

In order to better solve this problem, there is provided, in accordance with one aspect of this invention, a tread which has no undertread, but which has at least one tread element interconnected with a pair of tread portions by interconnecting means in such a manner as to permit canting of the tread portions relative to the tread element whereby the overall length of the tread may be increased or decreased to facilitate its application to a tire.

An additional benefit of such a tread is that it can be more easily fitted on a tire whose tread-receiving surface is variable in circumference in the transverse direction of the tread.

There is also provided, in accordance with another aspect of this invention, a method of retreading a tire involving the application circumferentially about the tread-receiving surface of a tire a tread which does not have an undertread portion and which is adjustable in the longitudinal direction of the tread by movement of tread elements relative to each other.

In the drawings:

FIG. 1 is a perspective view of a tire retreaded with a tread in accordance with an aspect of this invention;

FIG 2. is a plan view of part of a tread made in accordance with an aspect of this invention;

Figure 1:
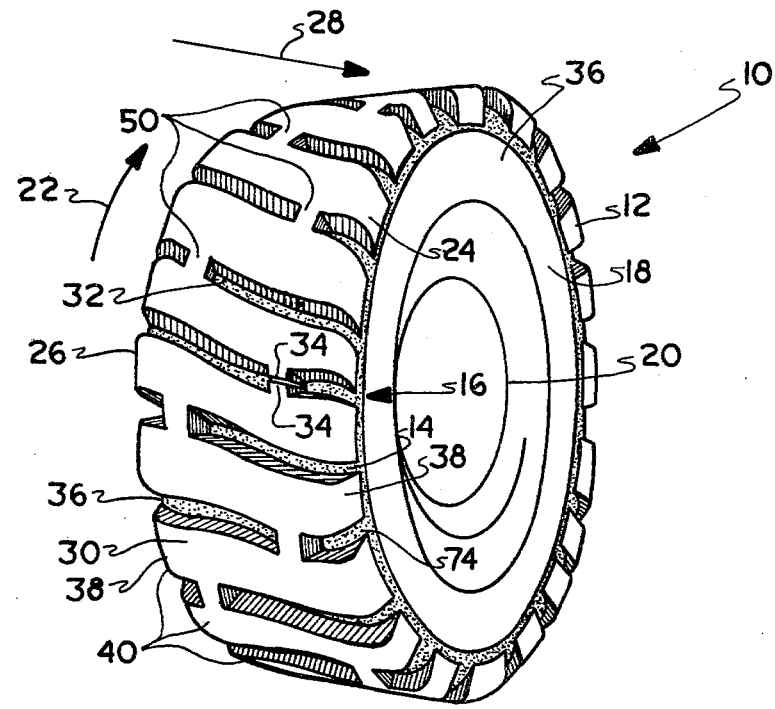

With reference to FIG. 1, there is illustrated a large off-the-road tire 10 with a tread 12 cured on the exterior tread-receiving surface 14 of the crown portion 16 thereof. The tire 10 is generally toroidal shaped with a pair of sidewalls 18 extending radially inwardly from the crown portion 16 to a pair of generally circular inextensible beads 20. The crown portion 16 extends circumferentially of the tire 10 and is the radially outer portion thereof. The terms "radially" and "radial" refer to directions generally perpendicular to the axis of rotation of a tire.

The tread 12 is elongated and adjustable in its longitudinal direction for application to a tire 10. Its longitudinal direction refers to a direction along the tread 12 corresponding to a circumferential direction along the crown portion of a tire when the tread is applied thereon and is depicted by the numeral 22. The tread 12 has a first and a second side 24 and 26, respectively, each of which extends longitudinally thereof. The transverse direction of the tread refers to a direction across the tread toward one of the sides 24 or 26 and is depicted by the numeral 28. The tread 12 is further provided with an upper surface 30 for engaging the ground, a lower surface 32 for adhesion to the crown portion of a tire, and a pair of ends 34 extending between the sides 24 and 26. The sides 24 and 26 are longer than the ends 34 and extend between the upper and lower surfaces 30 and 32, respectively.

The tread 12 may be made of any material consistent with good engineering practice. It is preferably made of elastomeric material such as rubber or urethane which has been precured.

A preferred embodiment of the tire, shown in FIG. 1, includes a plurality of elongated tread elements 40 which extend transversely across the tread 12 between the sides 24 and 26 and are spaced apart in a generally longitudinal direction 22 in side-by-side relationship. Although the tread elements 40, shown in FIGS. 1–4, are lugs, their shape and size is not limited to any particular configuration, as illustrated in FIG. 5. When the tread 12 is applied circumferentially about a tire 10, these tread elements or lugs 40 extend between the shoulders 36 as shown in FIG. 1.

The tread elements 40 are joined by interconnecting means 50 which do not necessarily have to be made of the same material as the tread elements 40 are made. A major function of the interconnecting means 50 is to hold the tread elements 40 in a desired spatial relationship until they are placed about the crown portion 16 of a tire 10 and bonded thereto. Consequently, it is not inconceivable that these interconnecting means 50 be removable metallic pins. It is preferable that these interconnecting means 50 be portions of elastomeric material or tie-bars integrally connected between the tread elements 40.

Figure 2:
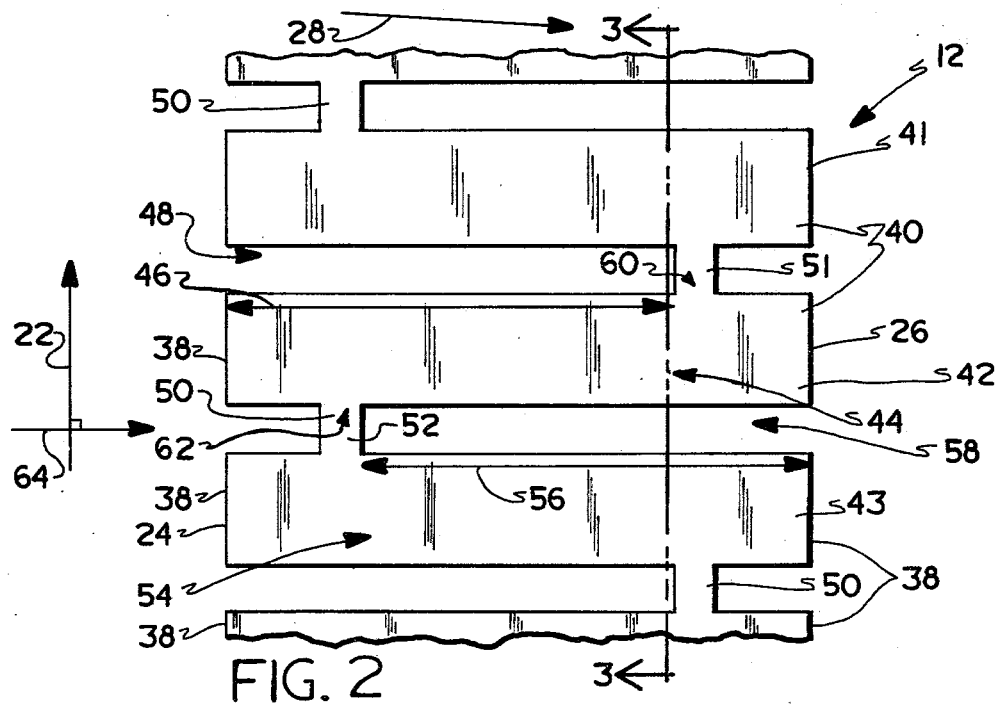

FIG. 2 shows part of a tread 12 which comprises at least one tread element depicted as 42 and a pair of tread portions depicted as 41 and 43. Tread portions 41 and 43 may comprise one or more tread elements 40 or any other portions of tread lying adjacent and spaced from tread element 42 in a generally longitudinal direction 22 of the tread 12.

An interconnecting means 50 extends between and interconnects tread element 42 with each tread portion 41 and 43 to define a pair of spaces 48 and 58, respectively, which overlap in a direction parallel to the upper surface 30 and perpendicular to the longitudinal direction 22 of the tread. Space 48 extends through the tread 12 between tread element 42 and tread portion 41. This space 48 divides or severs the first side 24 of the tread 12 and the upper and lower surfaces 30 and 32, respectively, along the entire distance from the first side 24 of the tread 12 to the corresponding interconnecting means 50. Space 58 extends through the tread 12 between tread element 42 and tread portion 43. This space 58 divides or severs the second side 26 of the tread 12 and the upper and lower surfaces 30 and 32, respectively, along the entire distance from the second side 26 of the tread to the corresponding interconnecting means 50.

A first interconnecting means 51 extends between and interconnects tread portion 41 with tread element 42, such as to define two portions of tread element 42, one of which extends toward the first side 24 of the tread 12 and is designated as an operative portion 44 of tread element 42. This operative portion 44 extends the distance indicated by 46 from the first interconnecting means 51 to one of the end surfaces 38 of tread element 42. The first interconnecting means 51 also defines space 48 extending through the tread 12 between tread portion 41 and operative portion 44. This space 48 divides or severs the first side 24 of the tread 12 and the upper and lower surfaces 30 and 32, respectively, along the entire distance from the first side 24 of the tread 12 to the first interconnecting means 51.

A second interconnecting means 52 extends between and interconnects the operative portion 44 of tread element 42 and tread portion 43 to define two portions of tread portion 43, one of which extends toward the second side 26 of the tread 12 and is designated as operative portion 54 of tread portion 43. This operative portion 54 extends the distance indicated by 56 from the second interconnecting means 52 to one of the end surfaces 38 of tread portion 43. The second interconnecting means 52 also defines space 58 extending through the tread 12 between tread element 42 and operative portion 54. This space 58 divides or severs the second side 26 of the tread 12 and the upper and lower surfaces 30 and 32, respectively, along the entire distance from the second side 26 of the tread 12 to the second interconnecting means 52.

Figure 3:
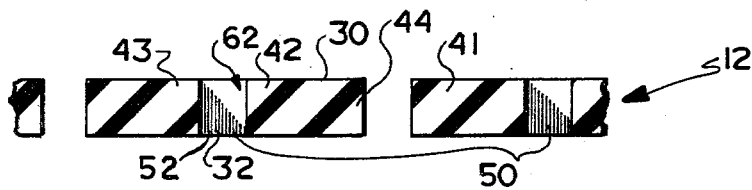
FIG. 3 is a cross-section view of the tread part shown in FIG. 2, taken along line 3—3 thereof.

As clearly shown in FIG. 3, the operative portion 44 of tread element 42 is not connected to tread portion 41 except by the connection provided by the first interconnecting means 51. In other words, there is no layer of material underlying and extending between the operative portion 44 of tread element 42 and tread portion 41 nor are there any interconnecting means extending therebetween of sufficient strength to prevent canting movement of the operative portion 44 of tread element 42 relative to tread portion 41. Likewise, operative portion 54 is not connected to tread element 42.

Both first and second interconnecting means 51 and 52, respectively, have portions 60 and 62, respectively, which engage the second tread element 42. These portions 60 and 62 are spaced apart in a direction, shown as 64 in FIG. 2, generally parallel to the upper surface 30 and perpendicular to the longitudinal direction 22 of the tread 12.

Figure 4:
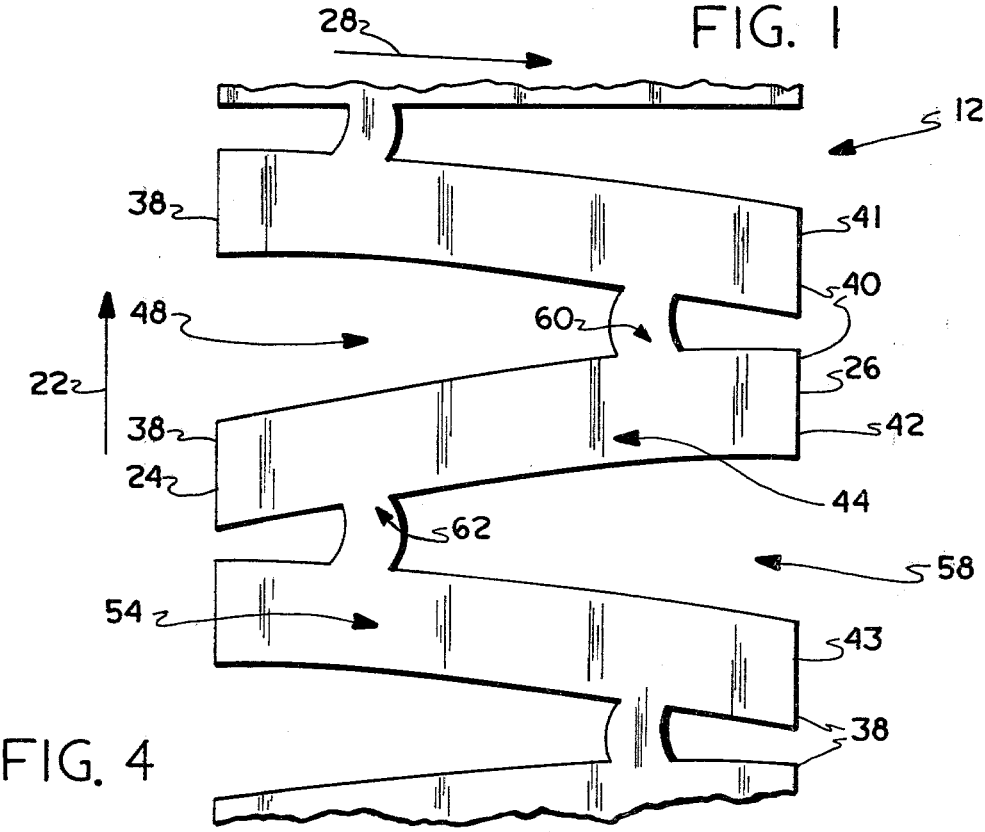
FIG. 4 is a plan view of the part of the tread shown in FIG. 2 with an exaggerated increase in its overall length.
Figure 5:
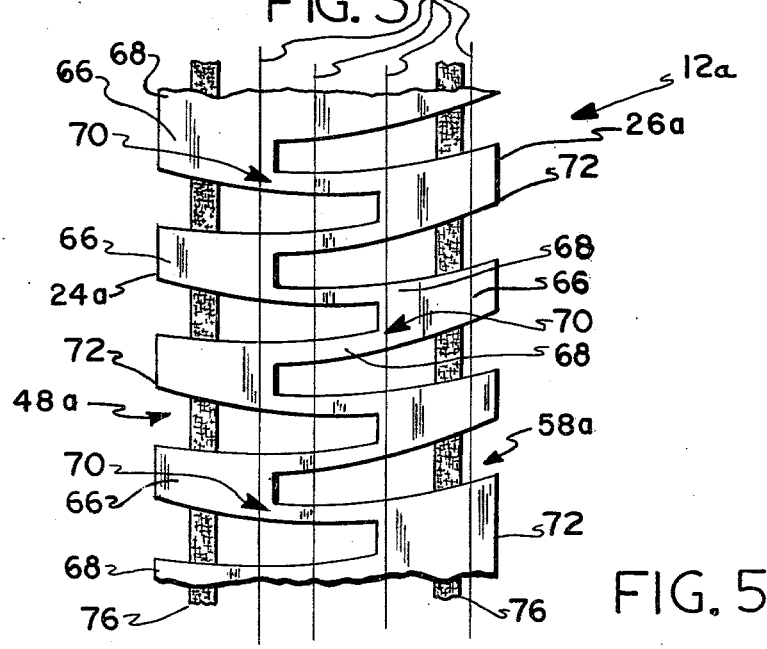
FIG. 5 is a plan view of an alternative embodiment of part of a tread in accordance with an aspect of this invention.

FIG. 4 shows in exaggerated form a lengthening of the part of the tread 12 shown in FIG. 2 in the longitudinal direction 22 to facilitate its application to a tire. This is accomplished by canting of tread elements 40 as described hereinafter and not by stretching of the material of the tread 12 although some slight stretching may occur during such lengthening.

Since the operative portion 44 of tread element 42 is free of any restraining connection with tread portion 41 other than at the first interconnecting means 51, operative portion 44 is movable angularly relative to tread portion 41 by canting of operative portion 44 relative to tread portion 41 with the first interconnecting means 51 acting as a fulcrum for such movement. Since the second interconnecting means 52 is connected to the operative portion 44 of tread element 42, it will be displaced longitudinally a distance related to the amount of angular movement of operative portion 44 and the distance which portions 60 and 62 are spaced apart in direction 64. As this distance which portions 60 and 62 are spaced apart increases, the distance which the second interconnecting means 52 is displaced longitudinally for a given angular movement of operative portion 44 also increases. Preferably, portions 60 and 62 of interconnecting means 51 and 52 which engage tread element 42 are positioned a distance from a side 24 or 26 of the tread 12 which is not more than 25 percent of the distance between the sides of the tread. Since tread portion 43 is connected to the second interconnecting means 52, it will also be displaced in the longitudinal direction 22 such as to result in an overall increase in distance longitudinally between the tread portions 41 and 43. Thus, the tread 12 may be lengthened or shortened in the longitudinal direction 22 by canting the tread elements 40 as described above to facilitate application of the tread 12 to a tire.

The sequence of tread elements 40 and interconnecting means 50, as described above and shown in FIG. 2, may be repeated throughout the length of the tread 12, as shown in FIG. 1. But, in accordance with this invention, this is not required. The sequence described above and shown in FIG. 2 may be terminated and the remainder of the tread may have a different or conventional tread structure.

It should not normally be necessary to shorten or lengthen a tread 12 by more than perhaps the width of a tread element 40 in order to facilitate its application to a tire since the tread portion 12 usually will be cut approximately to the length around the crown portion 16. If the entire tread 12 is substantially the same configuration as shown for the tread 12 in FIG. 1, then only very little canting movement will be required of each tread element 40.

Various modifications in accordance with this invention can be made to the overall spacing and configuration of the tread elements and interconnecting means such as shown by tread part 12a in FIG. 5, wherein an interconnecting means 66 extends the entire distance between the operative portion 70 of a tread element 68 and an end surface 72 thereof. For example, in FIG. 2, there may be more than one interconnecting means 50 joining tread element 42 with tread portion 41, as long as none of them join the operative portion 44 of tread element 42 with tread portion 41.

It is readily observable, as shown in FIG. 5, that any longitudinal plane 73 passing through the tread 12a parallel to the first side 24a will pass through at least one of the spaces 48a and 58a. If interconnecting means 66 extend between and interconnect three or more tread elements 68 to define at least two spaces 48a and 58a which extend the entire distance between the upper and lower surfaces of the tread and which sever the first and second sides 24a and 26a, respectively (each side being severed by at least one of the spaces) and which overlap such that any longitudinal plane 73 passing through the tread 12a parallel to the first side 24a passes through at least one of the spaces 48a and 58a, then the tread elements 68 may be canted in accordance with an aspect of this invention to facilitate application to the tread 12a to a carcass.

Tire 10 is retreaded in accordance with an aspect of this invention by preparing the tread-receiving surface 14 of a tire 10 to receive a tread 12. This may require removing an old tread and buffing the surface of the tire 10 which is to receive the tread 12. Cement may also be applied to the tread-receiving surface 14. A tread-receiving surface, as used herein, refers to the surface circumferentially around the crown portion of a tire upon which a tread is applied.

A bonding layer 74 of uncured elastomeric material may be applied about the tread-receiving surface 14 for the purpose of bonding the tread 12 to the tire 10. This bonding layer 74 may not be necessary if the tread to be applied is not cured before its application.

A tread 12 is selected which does not have an undertread and which is adjustable in the longitudinal direction 22 of the tread 12 by movement of tread elements 40 relative to each other. Preferably, the tread 12 is precured before its application about the tread-receiving surface 14 of the tire 10 in which case a bonding layer 74 is applied between the tread 12 and the tread-receiving surface 14. Although it is preferable that the tread 12 be adjustable by canting of tread elements as described above, this is not necessary as long as the tread is adjustable by movement of tread elements relative to each other.

The lower surface of the tread 12 may be buffed and coated with cement. One or more pieces of fabric 76, as shown in FIG. 5, may be applied longitudinally of the tread 12 to temporarily engage the lower surface 32 of the tread to stabilize the positions of the tread elements 40 as the tread is being applied.

The tread 12 is applied circumferentially about the tread-receiving surface 14 and the stabilizing fabric 76 is removed as the tread is applied. The tread elements 40 are positioned on the tread-receiving surface 14 and the length of the tread 12 adjusted to permit butt-splicing of the ends 34 of the tread 12 as shown in FIG. 1. This is accomplished by moving the tread elements 40 individually relative to adjacent tread elements and repositioning them on the tread-receiving surface 14 until the ends 34 of the tread are adjacent each other. The ends 34 of the tread 12 are then butt-spliced and the whole tire assembly including the tread 12 is cured by a method commonly practiced in the tire building art.

While certain representative embodiments and details have been shown for the purpose of illustrating the invention, it will be apparent to those skilled in the art that various changes and modifications may be made therein without departing from the spirit or scope of the invention.

What is claimed is:

1. An elongated tread adjustable in the longitudinal direction for application to a tire, the tread comprising an upper surface, a lower surface, a first and a second side extending longitudinally of the tread between said upper and lower surfaces, at least one tread element extending in a transverse direction of the tread, a pair of tread portions spaced from said tread element in generally the longitudinal direction of the tread, and an interconnecting means extending between and interconnecting said tread element with each of said tread portions to define a pair of spaces which overlap in a direction parallel to the upper surface and perpendicular to the longitudinal direction of the tread, one of said spaces extending through the tread between said tread element and one of said tread portions and severing said first side and said upper and lower surfaces along the entire distance from said first side to the corresponding interconnecting means and the other of said spaces extending through the tread between said tread element and the other of said tread portions and severing said second side and said upper and lower surfaces along the entire distance from said second side to the corresponding interconnecting means to permit canting of each of said tread portions relative to said tread element.

2. An elongated tread according to claim 1, wherein the tread is of precured elastomeric material.

3. An elongated tread according to claim 1, wherein said tread element and said tread portions are lugs of elastomeric material which extend between said sides and said interconnecting means comprise tie-bars of elastomeric material integrally connected between said lugs.

4. A tread according to claim 1, wherein said interconnecting means comprises tie-bars of elastomeric material each of which includes a portion which engages said tread element, said portions which engage said tread element being spaced apart in a direction parallel to the upper surface and perpendicular to the longitudinal direction of the tread.

5. An elongated tread according to claim 4, wherein said portions of said interconnecting means which engage said tread element are positioned a distance from a side of the tread which is not more than 25 percent of the distance between the sides of the tread.

6. An elongated tread adjustable in its longitudinal direction for application to a tire, the tread comprising an upper surface, a lower surface, a first and a second side extending longitudinally of the tread between said upper and lower surfaces, at least three tread elements spaced in generally the longitudinal direction of the tread and extending in a transverse direction of the tread, interconnecting means extending between and interconnecting said tread elements to define at least two spaces which extend the entire distance between said upper and lower surfaces and which overlap such that any longitudinal plane passing through the tread parallel to said first side passes through at least one of said spaces, said first and second sides each severed by at least one of said spaces.

7. An elongated tread according to claim 6, wherein the tread is of precured elastomeric material.

8. A method of retreading a tire comprising:
   (a) preparing a tread-receiving surface of the tire to receive a tread;
   (b) applying circumferentially about the tread-receiving surface of the tire a tread which does not have an undertread portion and which is adjustable in the longitudinal direction of the tread by movement of tread elements relative to each other;
   (c) adjusting the length of said tread to permit butt-splicing of the ends of said tread;
   (d) butt-splicing the ends of said tread; and
   (e) curing the resulting assembly.

9. A method according to claim 8, further comprising the step of applying a bonding layer of elastomeric material to the tread-receiving surface before application of said tread.

10. A method according to claim 9, wherein said tread is of precured elastomeric material.

11. A method according to claim 8, wherein the step of applying the tread includes stabilizing the positions of the tread elements by engaging the lower surface of said tread with a fabric, the step of applying the tread further includes removing the stabilizing fabric from said tread while said tread is being applied to the tread-receiving surface.

* * * * *